United States Patent [19]

van Vuuren

[11] Patent Number: 4,892,152
[45] Date of Patent: Jan. 9, 1990

[54] CUTTING UNIT FOR CUTTING ONE OR MORE SODS

[76] Inventor: Johannes van Vuuren, Harmelerwaard 21, 3481 LC Harmelen, Netherlands

[21] Appl. No.: 232,165
[22] Filed: Aug. 15, 1988

[30] Foreign Application Priority Data

Aug. 14, 1987 [NL] Netherlands ............... 8701921

[51] Int. Cl.⁴ ............................................. A01B 45/04
[52] U.S. Cl. ........................................ 172/20; 74/570; 172/280
[58] Field of Search ............. 172/19, 20, 280, 282; 171/46, 110, 82, 143; 56/15.6, 15.7, 15.8

[56] References Cited

U.S. PATENT DOCUMENTS

| | | | |
|---|---|---|---|
| 1,815,274 | 7/1931 | Ronning et al. | 56/15.8 |
| 2,259,892 | 10/1941 | Hyman | 56/15.7 |
| 2,264,565 | 12/1941 | Coultas et al. | 56/15.6 X |
| 2,372,459 | 3/1945 | Todd | 172/280 X |
| 3,509,944 | 5/1970 | Brouwer | 172/20 X |
| 3,540,535 | 11/1970 | Brouwer | 172/20 |
| 3,561,791 | 2/1971 | Gego | 172/282 X |
| 3,570,153 | 3/1971 | Guinot | 172/282 X |
| 3,590,927 | 7/1971 | Brouwer et al. | 172/19 |
| 3,807,504 | 4/1974 | Nunes, Jr. | 172/20 |
| 3,887,013 | 6/1975 | Helberg | 172/20 |
| 4,029,152 | 6/1977 | Gerrits | 172/19 |
| 4,203,275 | 5/1980 | Vermeer | 56/15.8 |
| 4,616,713 | 10/1986 | Shattuck | 172/19 |
| 4,632,192 | 12/1986 | Hooks | 172/19 |
| 4,674,577 | 6/1987 | Meyer | 172/20 |

FOREIGN PATENT DOCUMENTS

| | | | |
|---|---|---|---|
| 153103 | 8/1985 | European Pat. Off. | 172/19 |
| 1912186 | 9/1970 | Fed. Rep. of Germany | 172/19 |
| 0280621 | 7/1966 | Netherlands | 172/19 |
| 1034964 | 7/1966 | United Kingdom | 56/15.3 |
| 1309822 | 3/1973 | United Kingdom | 56/15.6 |

Primary Examiner—Randolph A. Reese
Assistant Examiner—Jeffrey L. Thompson
Attorney, Agent, or Firm—John P. Snyder

[57] ABSTRACT

An implement for cutting one or more strip of sod is provided which can be attached to standard vehicles, such as tractors. The cutting head of the implement is mounted in a subframe which is pivoted about a longitudinal axis with respect to the vehicle such that it will follow any unevenness of the ground. A remotely controllable depth adjustment means is also provided for varying sod thickness. The adjustment means includes a large eccentric bushing for rough adjustment and a smaller hydraulically controlled eccentric bushing for fine adjustment.

9 Claims, 3 Drawing Sheets

CUTTING UNIT FOR CUTTING ONE OR MORE SODS

From the prior art a number of sod harvesting machines are known, such as from U.S. Pat. No. 3590927, the French patent application published under number 2128086, the European patent application EP-A 0153103, the U.S. Pat. No. 4616713 and the U.S. Pat. No. 3.877584. Those publications all relate to specially adapted machines and constructed assemblies for harvesting sods.

To reduce the costs of such machines the specially built vehicles are constructed in a simple way without much comfort for the driver.

The cutting unit of this invention can be attached to a great number of standardized vehicles, involving only a few modifications such as the control of the hydraulic equipment of such a tractor vehicle. Therefore, the user of this cutting unit can have a vehicle according to his taste and have a cutting unit according to the present invention attached thereto, while costs of such a combination will be lower than the existing machines and the satisfaction for the user will be much higher.

The converyor of the cutting unit can be provided beside or above the rear wheel of the vehicle, depending on the vehicle (U.S. Pat. No. 3.590.927 shows for example a conveyor provided above the rear wheel of a vehicle).

The pushing means for pushing said frame in the direction of forward movement of said vehicle can extend from further bars extending from the chassis of the vehicle between the rear and front wheels thereof; at such bars an hydraulic lifting device can be provided. In the preferred embodiment, the pushing means extend from the support member.

Preferably, the support member is connected at one end to the usual standard lifting device of said vehicle. However it is also possible to provide a further frame or further bars extending rearwardly from the vehicle between the rear wheels, such as to be able to carry even a bigger weight of sods behind the vehicle.

A cutting unit according to this invention is capable of following in a precise manner any unevenness and/or slopes of the ground surface that may occur, while the thickness of a sod will be maintained at a constant value. This is of particular importance if sods of relatively young grass are to be cut out, as those sods will be less strong than sods that have grown for a longer period.

This constant thickness of sods is also important for further standardization and mechanization of handling of sods.

The first sub-frame has a lesser weight than frames for cutting according to the prior art and therefore can readily follow any unevenness of the ground surface.

Preferably a bearing includes a pivot shaft, around which the first sub-frame easily can roll; however, more or less the same effect can be achieved by extending the first sub-frame rearwardly and connecting the sub-frame by means of two lateral beams, parallel to each other and providing a cup-and-ball joint between the two sub-frames.

Further features, advantages and details of the present invention will become apparent in the light of a description with references to a drawing, wherein.

Figure 1:
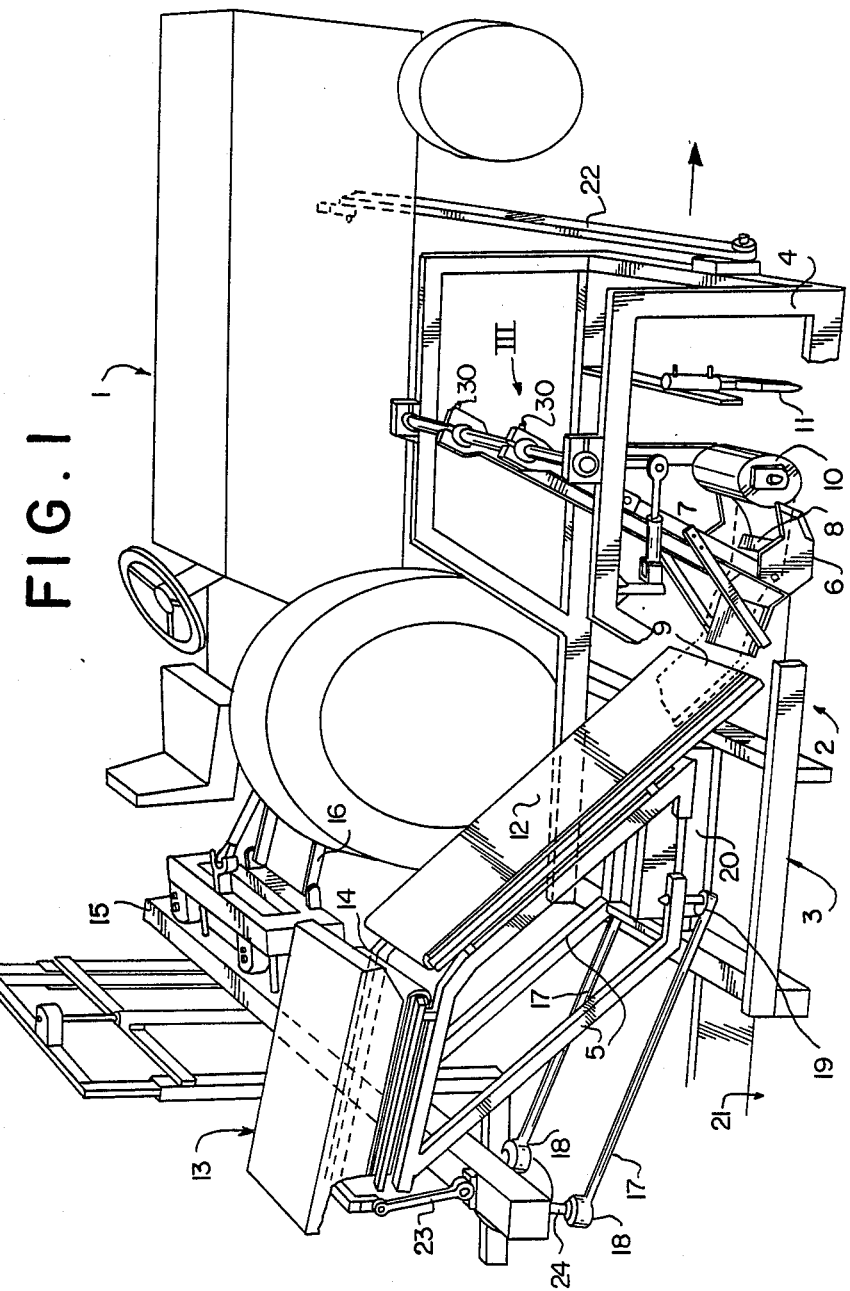
FIG. 1 shows a perspective side view of a preferred embodiment of the cutting unit in accordance with the current invention.

Coupled to a tractor 1 is a cutting unit 2 (FIGS. 1, 2), which comprises a frame 3 consisting of sub-frames 4 and 5. Arranged in sub-frame 4 are side blades 6 and 7 and a bottom blade 8 for cutting underneath a sod 9. A travelling roller 10 is guided over the sod 9 to be cut off, while a transverse blade 11 cuts a sod to length after a preferably electronically measured number of revolutions of roller 10.

Figure 2:
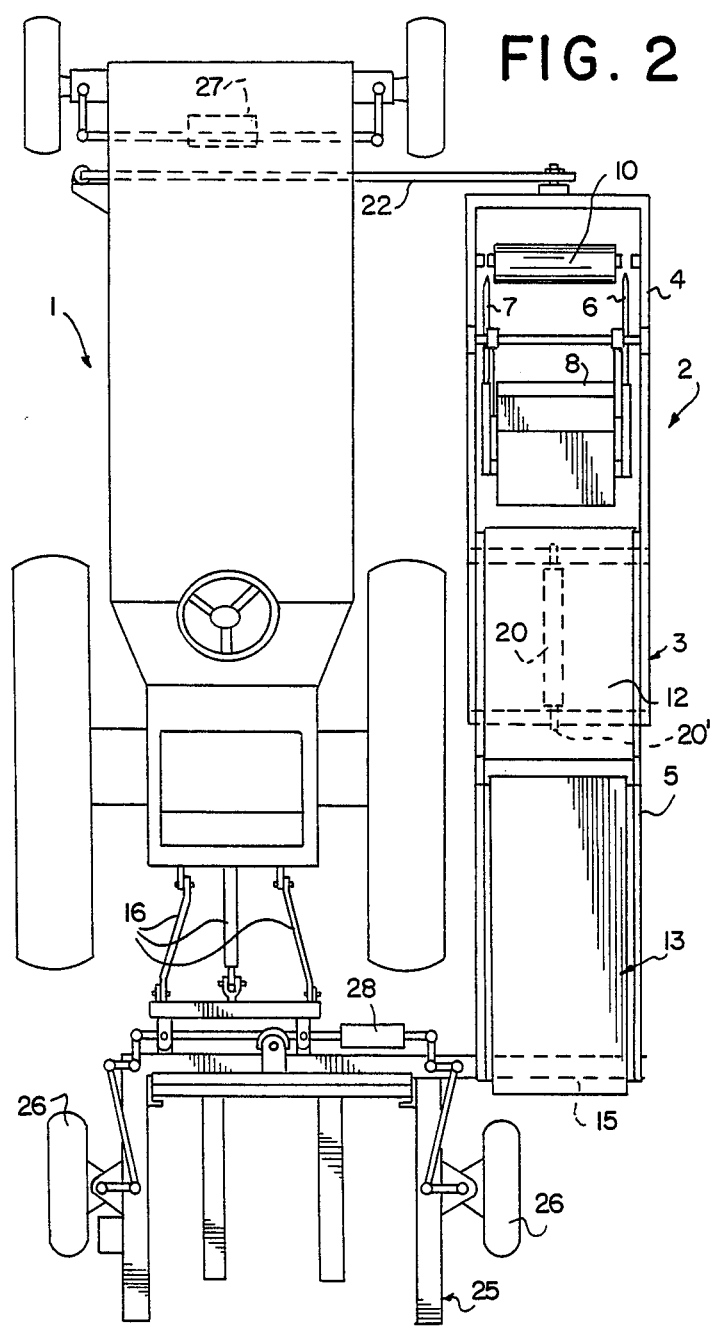
FIG. 2 is a top view of the embodiment shown in FIG. 1.

The sod 9 is upwardly conveyed via a conveyor 12 to the rear of tractor 1, following which the sod 9 is usually rolled up (in a manner not shown) in a unit 13 using a generally horizontal conveyor 14. A beam or support member 15 is coupled to lifting rods 16 of the tractor. The sub-frame 5 is linked to beam 15 via push rods 17 with interposed hinge joints 19 and 18. Attached to sub-frame 5, for example by being welded in position, is a bushing 20 which as seen in FIG. 2 rotatably receives a shaft 20' which is joined rigidly to sub-frame 4.

The comparatively small sub-frame 4 can roll about the axis of shaft 20' relative to frame 5 which carries the conveyors 12, 14 and therefore follow uneven terrain and/or slopes in the surface of the grassland 21, while the action of great forces on the bushing of bearing 20 is avoided because of the small weight of the sub-frame 4.

In order to be able to, in a manner further not shown, to raise the front of the cutting unit a little from the ground, for instance at the cross beam 22, for easy transport of the cutting unit, the latter is connected via a pivotable arm 23 to the beam 15, while the pivoting points 18, 19 and the connecting parts 24 move a small displacement distance.

Since the push rods 17 exert a pushing force in the vicinity of the cutting blades at approximately the same height, the cutting unit 2 follows precisely the movements of the tractor 1 and also those of the ground surface.

As can be seen particularly in FIG. 2, a storage holder 25 for the usually rolled-up grass sods can be provided behind the lifting arms 16 of tractor 1 with wheels 26, in order to prevent overloading of the shaft of the rear wheels of tractor 1. As is indicated schematically with blocks, a control 28 of the wheels 26 can be coupled to the control 27 of the front wheels of the tractor, in order to cause the beam 15 also to follow precisely the track of the tractor and prevent any slip of the wheels, e.g. on a wet ground surface. The control of the wheels can also be coupled with a tracking member for precisely tracking the edge of the ground surface covered with grass.

The additional control of the wheels 26 prevent slipping of the vehicle especially when those wheels are carrying a big load of sods (more than 1000 kg).

In the case of the above described preferred embodiment of a cutting unit, the latter is arranged at the side of the tractor, that is, the cutting unit is situated outside the plane projected onto the ground by the front and rear wheels. Such a cutting unit can be employed with different tractors, while drastic adaptations to the cutting unit itself for use with each different tractor are avoided. A cutting unit according to the invention can however also be coupled rigidly in the usual manner to a particular type of tractor, whereby the cutting head—with sub-frame 4 having smaller dimensions than drawn—could then perhaps be located between the wheels of a tractor, while the unit 13 could be situated above the rear wheel. The storage holder is formed in such an embodiment by a separately drawn trailer. The cross beam 22 would extend in front of the front wheel of the tractor.

Figure 3:
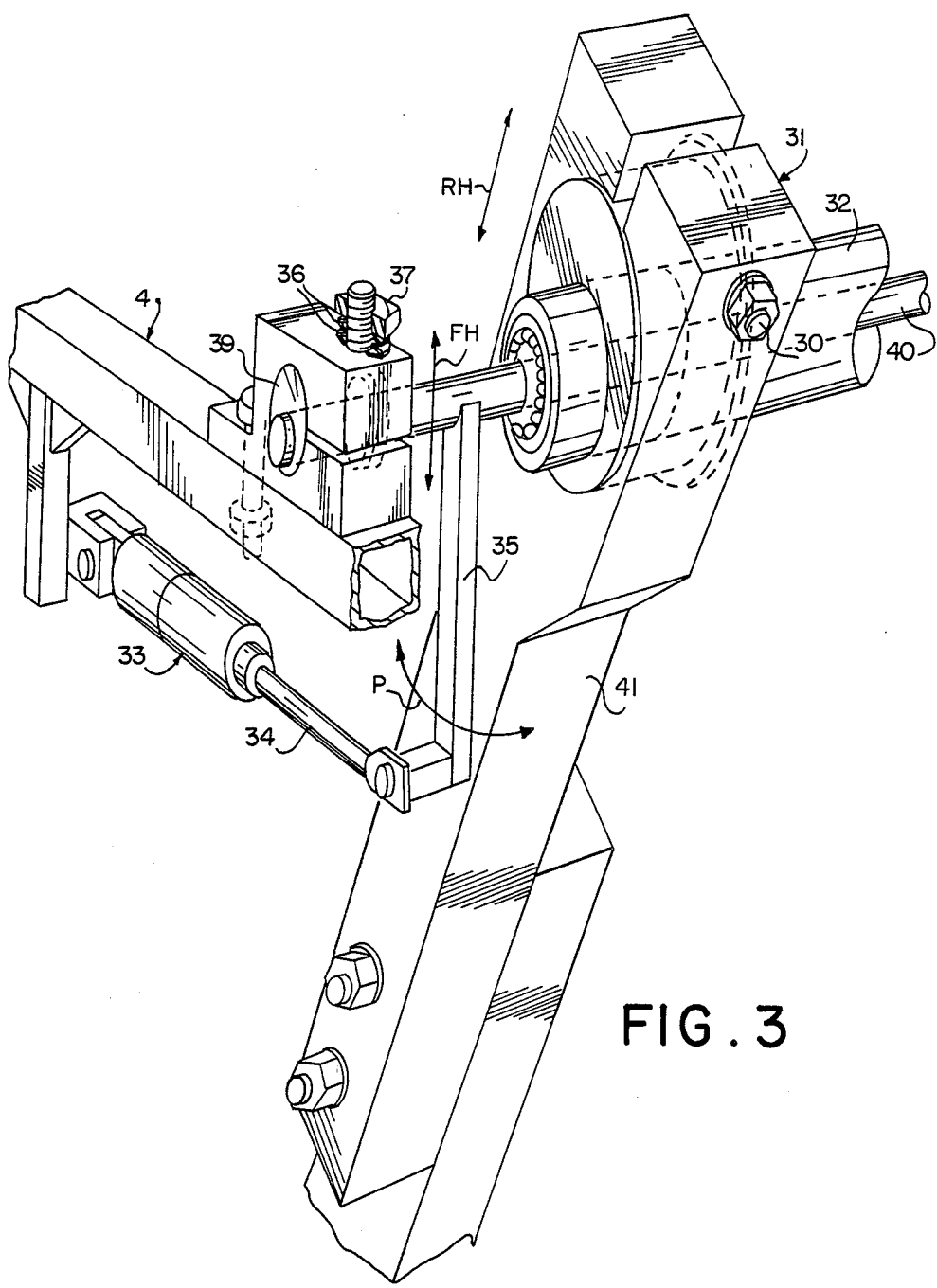
FIG. 3 is detail III from FIG. 1.

The cutting unit according to the invention further comprises a remotely controllable adjustment—performed from the tractor during travel—of the thickness of the grass sod to be cut off (FIG. 3). After setting of a rough height adjustment indicated by arrow RH using screw bolts 30 by clamping the bushing 32 accommodated eccentrically inside the bearing 31 in position relative to sub-frame 4, a fine height adjustment FH can be made. A hydraulic drive element 33 via piston rod 34 pivots the arm 35 as indicated by arrow P to make the fine adjustment. An inner shaft 40 can, together with a bushing 39, in which inner shaft 40 is mounted eccentrically for rotation, be turned by the drive element counter to a spring force of a spring 36 fixed into position with a nut 37. As a result, the position of the arm 41, which determines the position of the blades 6, 7 and 8 (FIG. 1) relative to frame part 4, is adjusted. The inner shaft 40 is mounted for rotation in the centre of bushing 32.

I claim:

1. Cutting apparatus for cutting sods comprising in combination, a powered vehicle including front wheels at the forward end thereof and rear wheels at the rear end thereof and being movable in a forward direction of movement over a ground surface, a frame operatively connected to said vehicle, a cutting head supported by said frame and being shaped for cutting sods out of a ground surface, a conveyor supported by said frame for conveying sods upwardly, support means for supporting said frame and said conveyor, said support means being connected to said vehicle rearwardly of a rear wheel of said vehicle, and pushing means supported by said support means for pushing said frame in said forward direction of movement of the vehicle, said pushing means being connected to said frame near a ground surface at a location below said conveyor and rearwardly of said cutting head.

2. Apparatus as defined in claim 1 wherein said vehicle includes lifting means, said support means being connected to said lifting means.

3. Apparatus as defined in claim 1 wherein said pushing means has a forward end portion thereof connected to said frame and a rearward end portion thereof connected to said support means.

4. Apparatus as defined in claim 1 including a storage holder connected to the rear end of said vehicle, said storage holder having at least two support wheels.

5. Apparatus as defined in claim 4 wherein said two support wheels are steerable.

6. Apparatus as defined in claim 5 including first control means for controlling the steering of the said two support wheels, second control means for controlling the steering of said front wheels of the vehicle, said first and second control means being coupled together so that said two support wheels and said front wheels are steerable together.

7. Apparatus as defined in claim 1 including means for adjusting the position of said cutting head to vary the thickness of sods cut during travel of said vehicle.

8. Apparatus for cutting sods comprising in combination, a powered vehicle movable over a ground surface in a forward direction, a first sub-frame supported by said vehicle, a cutting head supported by said first sub-frame, a second sub-frame supported by said vehicle, a conveyor supported by said second sub-frame for upwardly conveying sods, said first and second sub-frames being connected by bearing means disposed rearwardly of said cutting head and below said conveyor for supporting said first sub-frame for pivotal movement with respect to said second sub-frame about a pivot axis which extends substantially horizontal and parallel to the forward direction of movement of said vehicle so as to follow uneven terrain and/or slopes of a ground surface over which said vehicle travels.

9. Apparatus as defined in claim 8 wherein said bearing means includes said pivot axis.

* * * * *